Patented Nov. 11, 1952

2,617,789

UNITED STATES PATENT OFFICE 2,617,789

ACETYLENE-VINYL CARBOXYLATE COPOLYMERS

Frank Clifton McGrew, Wilmington, Del., and Paul Swithin Pinkney, Niagara Falls, N. Y., assignors to E. I. du Pont de Nemours & Company, Wilmington, Del., a corporation of Delaware No Drawing. Application October 3, 1950, Serial No. 188,271

4 Claims. (Cl. 260—87.3)

This invention relates to new compositions of matter. More particularly it relates to new organic polymeric materials and to a method for preparing them.

Copolymers of two or more copolymerizable ethylenically unsaturated compounds such as ethylene with vinyl acetate, vinyl chloride with vinyl acetate, etc., are well known and they have been found useful in many applications. Likewise, copolymers of olefinic hydrocarbons such as ethylene and isobutylene with acetylene are known and products of this type have certain advantages. However, the hitherto known methods of polymerization have not been found effective in preparing copolymers of acetylene with negatively substituted ethylenic compounds.

This invention has as an object the preparation of copolymers of acetylene. Another object is the preparation of air drying copolymers of vinyl esters. Other objects will appear hereinafter.

These objects are accomplished by the invention of copolymers of acetylene with vinyl esters, the copolymers containing from 15 to 50 mole percent of combined acetylene, and their preparation by subjecting a mixture of acetylene and a vinyl ester containing at least 25 mole per cent and preferably not more than 75 mole per cent of acetylene under superatmospheric pressure to a temperature of from −20° C. to 250° C. in the presence of a free radical type vinyl polymerization initiator.

The products of this invention are unsaturated copolymers which are solids or viscous oils and which are soluble in organic solvents such as, for example, chloroform, acetone, methanol, phenol, benzene, dimethylformamide, and the like.

In one method for carrying out the process of this invention there are placed in a reaction vessel capable of withstanding high pressures a vinyl ester, e. g., vinyl acetate or vinyl chloride, a small amount, e. g., 0.015% to 5% of the weight of the comonomers, of a vinyl polymerization catalyst such as a free radical-liberating peroxide or azo compound, and, if desired, a reaction medium such as tertiary-butyl alcohol or water. The air in the reaction vessel is then replaced with an inert gas such as nitrogen, the vessel is closed and cooled in a solid carbon dioxide-acetone bath, and a quantity of acetylene amounting to at least 25 mole per cent of the total monomers is introduced into the reaction vessel. The closed reaction vessel is then heated to a temperature of from 40° to 150° C., with agitation, for from 2 to 30 hours under superatmospheric pressure, preferably at a pressure of 100–1000 atmospheres. The exact time of reaction depends on the particular catalyst and the particular reaction temperature employed, the longer times being required at temperatures where the catalyst employed generates free radicals very slowly. At the completion of the polymerization the reaction mixture is removed from the reactor, steamed to remove volatile materials and the residual polymer is dried.

In another method of carrying out the process of this invention, a mixture of the vinyl ester, reaction medium, and catalyst is heated to about 75° C. in a reaction vessel capable of withstanding a high pressure, and an excess of acetylene is circulated at a pressure of 300–500 lbs./sq. in. through the heated reaction mixture for several hours. At the end of the polymerization the excess acetylene is vented and the reaction mixture is worked up as described above.

An especially preferred method for preparing the acetylene/vinyl ester copolymers of this invention involves placing in a reaction vessel capable of withstanding very high pressures a mixture of acetylene and a vinyl ester in proportions of from 25 to 65 mole per cent acetylene, a reaction medium such as benzene or water, and 0.5% to 5.0% of the weight of the comonomers of a vinyl polymerization catalyst such as a free radical-generating peroxide or azo compound. The reaction vessel is closed, heated to 40° to 150° C. with vigorous agitation under a pressure of from 400 to 1000 atmospheres obtained by injecting an inert fluid, e. g., water, into the reaction vessel until the desired reaction pressure is obtained. Other inert fluids besides water can be used to obtain the desired pressure. Specific examples of such other fluids include methyl, ethyl, and t-butyl alcohols, and nitrogen. The polymerization is continued for 5 to 30 hours under these conditions with intermittent injection of water to maintain the desired pressure, at the end of which the reaction mixture is cooled and the copolymer isolated as described previously.

The process of this invention can be carried out in general at temperatures ranging from −20° to 250° C. However, it is preferable to use temperatures of at least 40° C. in order to obtain a practicable rate of polymerization. Likewise, it is preferable to use temperatures below 150° C. in order to reduce the discoloration of the resulting copolymer caused by temperatures above 150° C. Because of the low boiling point of acetylene, the process is carried out under superatmospheric pressure. The autogenous pressure of the reaction mixture at the temperature at which the polymerization is being carried out can be used but higher pressures, e. g., up to 500 lbs./sq. in., can be obtained by introducing a larger excess of acetylene under the desired pressure. Still higher pressures, e. g., up to 1000 atmospheres can be obtained by introducing an inert fluid such as water into the reaction vessel to give the desired pressure. Pressures of 400 to 1000 atmospheres are preferred since they favor the formation of copolymers containing higher proportions of acetylene.

The vinyl esters used in the practice of this invention are the ordinary grades commercially available. These are preferably redistilled just prior to use. The ordinary commercial grade of acetylene is also suitable for use in this process.

The following examples in which parts are by weight are illustrative of the invention.

Example I

Into a stainless steel tube capable of withstanding high pressure is charged 56 parts of vinyl acetate, 60 parts of benzene, and 3 parts of di(tertiary-butyl) peroxide. The air in the tube is flushed out with nitrogen and the reactor closed, cooled in a mixture of solid carbon dioxide and acetone, evacuated, and 30 parts of acetylene then added. The closed reactor is heated to 135° C. and water under high pressure is introduced into the reaction vessel until a pressure of 900 atmospheres is obtained. The reactor is maintained at 135° C. with vigorous agitation for 19 hours, the pressure being maintained at 900 atmospheres by the intermittent injection of water during this period. After the reaction vessel is cooled, the solvent is removed from the reaction mixture by steam distillation. The organic residue is dried in a vacuum oven at 50° C. under a blanket of nitrogen. There is obtained 5.5 parts of a very viscous liquid copolymer of acetylene and vinyl acetate. This copolymer is found by analysis to have the following composition: C, 68.56%, 68.39%; H, 7.92%, 7.80%; Iodine No. 118.1, 118.8. On the basis of this iodine number which indicates the amount of ethylenic unsaturation in the copolymer, this copolymer contains 41.6 mole per cent of acetylene units.

The acetylene/vinyl acetate copolymer of Example I dissolved in xylene and containing 0.5%, based on the weight of the copolymer, of cobalt naphthenate drier is flowed onto phosphated steel plates. In 15 hours at room temperature, the film is dry, and it is insoluble in xylene and butanol (good solvents for polyvinyl acetate). This test illustrates the good air-drying characteristics of this copolymer.

Example II

This example illustrates the preparation of a copolymer by a method similar to that used in Example I, but which differs in that the ratio of vinyl acetate to acetylene is greater. The pressure reactor is charged with 112 parts of vinyl acetate, 40 parts of benzene, 3 parts of di(tertiary-butyl) peroxide and 20 parts of acetylene. The mixture is heated, as in Example I, at 135° C. for 18 hours under a pressure of 900 atmospheres obtained by the injection of water during the reaction period. Twenty-one parts of a viscous amber-colored resin, a copolymer of acetylene and vinyl acetate, is isolated in the manner described in Example I. This copolymer has the following composition: C, 61.15%, 61.09%; H, 7.60%, 7.65%; Iodine No. 56.4, 54.2. The acetylene content of this copolymer is 16.6%, based on the iodine number determination.

A solution of the copolymer of Example II in xylene containing 0.1%, based on the weight of the copolymer, of cobalt naphthenate, is cast on phosphated steel plates. After drying 15 hours at room temperature, the coatings are still soluble in xylene and butanol. The coatings on plates heated at 110° C. for 15 hours are insoluble in xylene and butanol.

A copolymer of acetylene and vinyl acetate containing 12 mole per cent acetylene (based on iodine number determination) and formulated into a coating composition with 0.1% cobalt naphthenate drier is not insolubilized even by baking for 15 hours at 125° C.

Example III

A stainless steel reactor is charged with 60 parts of cyclohexane and 2.5 parts of alpha,-alpha' - azobis(alpha,gamma - dimethylvaleronitrile), the air in the reactor flushed out with nitrogen and then the reactor is closed, cooled in a mixture of solid carbon dioxide and acetone, and evacuated. Into the reactor are introduced 60 parts of vinyl chloride and 26 parts of acetylene (this amount of acetylene corresponding to 50 mole per cent of the total monomers) and the reactor is then heated to 60° C., with agitation, for nine hours. The reaction mixture is under an autogenous pressure of 400 lbs./sq. in. under these conditions. At the end of this period, the reaction mixture is cooled, excess gas vented, and the reaction product steamed to remove volatile materials. There is thus obtained four parts of a dark brown, tacky copolymer containing 36.9% chlorine and 2.86% nitrogen. These data indicate that the polymer contains 22.5% catalyst residues, 65% vinyl chloride and 12.5% combined acetylene (by weight). This corresponds to a molar composition of 33 mole per cent acetylene.

The examples have illustrated the preparation of copolymers of acetylene with specific vinyl esters; however, the process of this invention has generic application in the preparation of copolymers of acetylene and vinyl esters. Thus, there may be employed the vinyl esters of aliphatic carboxylic acids, e. g., vinyl formate, vinyl acetate and vinyl trimethylacetate; vinyl esters of aromatic carboxylic acids, e. g., vinyl benzoate; and vinyl esters of inorganic acids, e. g., vinyl fluoride and vinyl chloride.

As indicated above, it is necessary to employ a mixture of vinyl ester and acetylene containing at least 25 mole per cent of acetylene to obtain a copolymer containing a substantial proportion of acetylene. By using comonomer mixtures containing at least 25 mole per cent of acetylene, products containing from 15 to 50 mole percent of combined acetylene are obtained. As the ratio of acetylene to vinyl ester in the monomer mixture is increased the conversions and catalyst efficiencies decrease; hence, for economic reasons, it is preferred to use monomer mixtures containing no more than 65 mole per cent of acetylene. However, higher proportions of acetylene are operable, i. e., the vinyl ester can be copolymerized in the presence of more than 65 mole per cent of acetylene, e. g., 70–75 mole per cent, if desired.

The catalysts which are generally operable for initiating the copolymerization of vinyl esters with acetylene are the free radical-forming addition polymerization catalysts, i. e., the free radical-liberating organic polymerization catalysts, preferably those having the general formula RXXR', wherein R is a monovalent organic radical, R' is a monovalent organic radical or hydrogen, and X is an element of integral atomic number of 7 to 8, i. e., nitrogen or oxygen. These free radical-liberating peroxide and azo compounds are employed in proportions ranging from 0.01% to 10% of the weight of the comonomers. Of these two types of catalysts the peroxide compounds are more effective in initiating the copolymerization of vinyl esters with acetylene than the azo compounds and can therefore be used in smaller amounts than the azo compounds. The preferred proportions of each type of catalyst depend on the particular proportion of acetylene being used in the polymerization. In general, larger proportions of catalyst are required for the polymerization of mixtures containing the larger proportions of acetylene. With dialkyl peroxide catalysts proportions as low as 0.015% of the comonomers are useful when the comonomer mixture contains 25 mole per cent of acetylene, but when mixtures containing 28 or more mole per cent of acetylene are being polymerized, at least 0.5% of peroxide compound is required. The preferred proportions of peroxide catalyst range from 0.5% to 5%. On the other hand, when azo catalysts are being employed, it is necessary to use at least 1% with monomer mixtures containing more than 25 mole per cent of acetylene. The preferred proportions of azo catalysts range from 1% to 5% of the weight of the comonomers.

The examples illustrate the use of one specific peroxide type of free radical-liberating catalyst. However, other specific examples of this type of catalyst which can be used include other dialkyl peroxides such as di(tertiary-amyl) peroxide, tertiary-butyl pentamethylpropyl peroxide; alkyl hydroperoxides such as tertiary-butyl hydroperoxide and 1-hydroxyethyl hydroperoxide-1; and diacyl peroxides such as benzoyl peroxide, acetyl peroxide and acetyl benzoyl peroxide.

The examples also illustrate the use of one azo catalyst in the process of this invention. However, other organic azo compounds wherein the azo, —N=N—, group is acyclic and bonded from both the nitrogens to discrete carbons which are aliphatic in character and at least one of which carbons is tertiary, i. e., attached to three other carbons by single valences, such as described by Hunt in U. S. Patent 2,471,959, can be used. Additional specific examples of other azo type free radical-generating catalysts which can be employed in preparing the copolymers of this invention include: α-(carbamylazo)isobutyronitrile, α-(carbamylazo)isobutyramide, α,α'-azobis(α-cyclohexylpropionitrile), dimethyl 1,1'-azodicyclohexanecarboxylate, and diethyl α,α'-azodiisobutyrate.

The examples have illustrated the use of certain organic solvents as reaction media in the process of this invention, but the process can also be carried out in the absence of any reaction medium, or can be carried out in aqueous emulsion. The process of this invention can also be carried out in the presence of other solvents or diluents. For example, the reaction medium can be another alcohol, e. g., methyl, ethyl, propyl, isopropyl, or n-butyl alcohol, another hydrocarbon, e. g., octane, isoheptane, benzene, and the like. In emulsion polymerization, it is desirable to include a dispersing agent, e. g., sodium dodecylsulfate, in the reaction mixture.

In view of the presence of a substantial amount of unsaturation in the copolymers of this invention, they are particularly useful as adhesives and as ingredients of various types of coating compositions. They are also useful as intermediates for the preparation of unsaturated polyalcohols.

The foregoing detailed description has been given for clearness of understanding only and no unnecessary limitations are to be understood therefrom. The invention is not limited to the exact details shown and described for obvious modifications will occur to those skilled in the art.

This application is a continuation-in-part of U. S. application Serial No. 20,854, filed April 13, 1948, now abandoned.

What is claimed is:

1. A copolymer of vinyl acetate and acetylene containing 15–50 mole per cent combined acetylene, the remainder being combined vinyl acetate.

2. A copolymer of acetylene with a vinyl ester of an aliphatic carboxylic acid, said copolymer containing 15–50 mole per cent combined acetylene, the remainder being said vinyl ester in combination.

3. Process for obtaining copolymers of acetylene with a vinyl ester of an aliphatic carboxylic acid wherein a mixture of said monomers containing 25–75 mole per cent acetylene, the remainder being said vinyl ester, is reacted at —20 to 250° C. under superatmospheric pressure in the presence of a free radical producing polymerization catalyst.

4. Process for obtaining acetylene vinyl acetate copolymers containing 15–50 mole per cent combined acetylene, the remainder being combined vinyl acetate wherein a mixture of vinyl acetate and acetylene, said mixture containing 25–65 mole per cent acetylene, the remainder being vinyl acetate, is heated at 40–150° C. for two to thirty hours at a pressure of 400–1000 atmospheres in the presence of a free radical producing polymerization catalyst, a portion of said pressure being obtained by injecting an inert fluid into the reaction mixture.

FRANK CLIFTON McGREW.
PAUL SWITHIN PINKNEY.

REFERENCES CITED

The following references are of record in the file of this patent:

UNITED STATES PATENTS

| Number | Name | Date |
| --- | --- | --- |
| 1,425,130 | Plauson | Aug. 8, 1922 |
| 2,363,910 | Swaney | Nov. 28, 1944 |
| 2,419,010 | Coffman | Apr. 15, 1947 |

FOREIGN PATENTS

| Number | Country | Date |
| --- | --- | --- |
| 811,433 | France | Jan. 14, 1937 |
| 845,661 | France | May 22, 1939 |

OTHER REFERENCES

Krczil, Kurzes Handbuch der Polymerisationstechnik, vol. II, page 71 (1941).